Sept. 28, 1965  F. M. BRAINARD  3,208,613
TURN-OVER JAR CLEANER
Filed Oct. 18, 1961  6 Sheets-Sheet 2

Sept. 28, 1965

F. M. BRAINARD 3,208,613

TURN-OVER JAR CLEANER

Filed Oct. 18, 1961

INVENTOR.
FRED M. BRAINARD
BY
ATTORNEYS

United States Patent Office 3,208,613
Patented Sept. 28, 1965

3,208,613
TURN-OVER JAR CLEANER
Fred M. Brainard, 123 N. Racine, Chicago, Ill.
Filed Oct. 18, 1961, Ser. No. 148,009
11 Claims. (Cl. 214—308)

The present invention relates to new and improved apparatus particularly devised for rapid dumping and cleaning out of glass or other types of jars prior to filling the jars with contents such as food products, and more particularly concerns a machine that will perform on a rapid, continuous mass production basis.

When glass jars are delivered from the factory, various incidental debris may be lodged therein, such as small glass particles, pieces of paper such as from the packing cartons, dust, and the like. It is therefore necessary to clean such foreign matter from the jars before they are filled with useful contents such as food in a food processing plant. Aside from such loose debris, the jars are generally clean and except for sterilization where they are to be filled with food contents they are ready for use.

It is an important object of the present invention to effect high speed, continuous, mass production cleaning of containers such as jars by inverting the containers and then delivering them right side up ready for filling.

Another object of the invention is to provide apparatus for cleaning containers such as jars of contained debris prior to filling by movement of the containers continuously forwardly from a source to a delivery point and in so moving the containers inverting the same for dumping out loose debris and then righting the containers so that their mouth ends are upwardly extending as the jars are moved on.

A further object of the invention is to provide in a jar handling machine new and improved means for safely, positively and efficiently inverting a continuous succession of jars on a high speed production basis.

Still another object of the invention is to provide in a jar handling machine new and improved means for inverting jars to be cleaned and then carrying the jars in an inverted position for a substantial distance while the interiors of the jars are cleaned of all loose debris.

A still further object of the invention is to provide in a jar handling machine a new and improved system of conveyors and rotatably operating handling devices by which a continuous succession of jars to be cleaned is adapted to be received from a supply conveyor, moved in upright condition to a rotary inverter, delivered to a conveyor which carries the jars for a substantial distance in inverted condition for thorough clean-out, released to a rotary returner, and finally moved in upright condition to a conveyor which transports the jars away for further processing such as filling with useful contents.

Yet another object of the invention is to provide a new and improved device for inverting articles on the order of jars.

It is also an object of the invention to provide new and improved conveyor means for transporting a succession of containers such as jars in a vertical position but free from support on either end.

A yet further object of the invention is to provide new and improved apparatus of the class described for handling containers such as jars and which is constructed and arranged for quick and easy adjustment to accommodate containers of various diameters.

An additional object of the invention is to provide a new and improved apparatus for cleaning open ended containers by inverting and shaking the containers to free debris therefrom to drop downwardly from the open ends of the inverted containers.

A yet additional object of the invention is to provide new and improved apparatus for inverting open ended containers to be cleaned out and subjecting the interiors of the inverted containers to clean-out fluid such as streams of air as the containers are transported in rapid succession.

Other objects, features and advantages of the present invention will be readily apparent from the following detailed description of a preferred embodiment thereof, taken in conjunction with the accompanying drawings, in which.

In the practical example of a machine according to the present invention a unitary, self-contained structure is provided comprising an elongated rectangular frame 15, FIGURES 1–4, made up of structual steel components suitably secured together as by bolting or welding. To this end the frame 15 includes a horizontal base frame 17 having across its ends horizontal flanges 18 provided with leveling screws 19. Uprights 20 rising from the corners of the rectangular base frame structure 17 rigidly secured together by cross bracing structure 21 and supporting at their upper ends parallel coextensive and coplanar rail bars 22.

Mounted upon and above the upper rail bars 22 is a horizontal conveyor assembly 23 located centrally between a rotary inverter assembly 24 mounted on the frame bars 22 adjacent one end of the conveyor 23 and a rotary returner 25 mounted on the frame bars 22 adjacent to the opposite end of the conveyor 23.

In a desirable construction, the conveyor assembly 23 includes a plurality, herein shown as four, coextensive, parallel, simultaneously operating flat top endless conveyor chains 27 mounted to run over respective pairs of sprockets 28 and 29 located in suitably spaced apart relation longitudinally of the machine frame 15 in parallel relation and mounted corotatively on respective horizontal, parallel shafts 30 and 31 supported in suitable bearings mounted on respective bracket plates 32 and 33 rigidly secured to a conveyor-supporting frame structure including uprights 34 mounted on the upper frame bars 22. At their upper ends, the conveyor frame uprights 34 carry horizontal, longitudinally extending side rails 34a and cross bars 35. Extending longitudinally in coplanar horizontal relation are respective pairs of coextensive rails 37 rigidly secured to the cross bars 35 and providing firm sliding support for the upper conveying flights of the conveyor chains 27.

Figure 1:
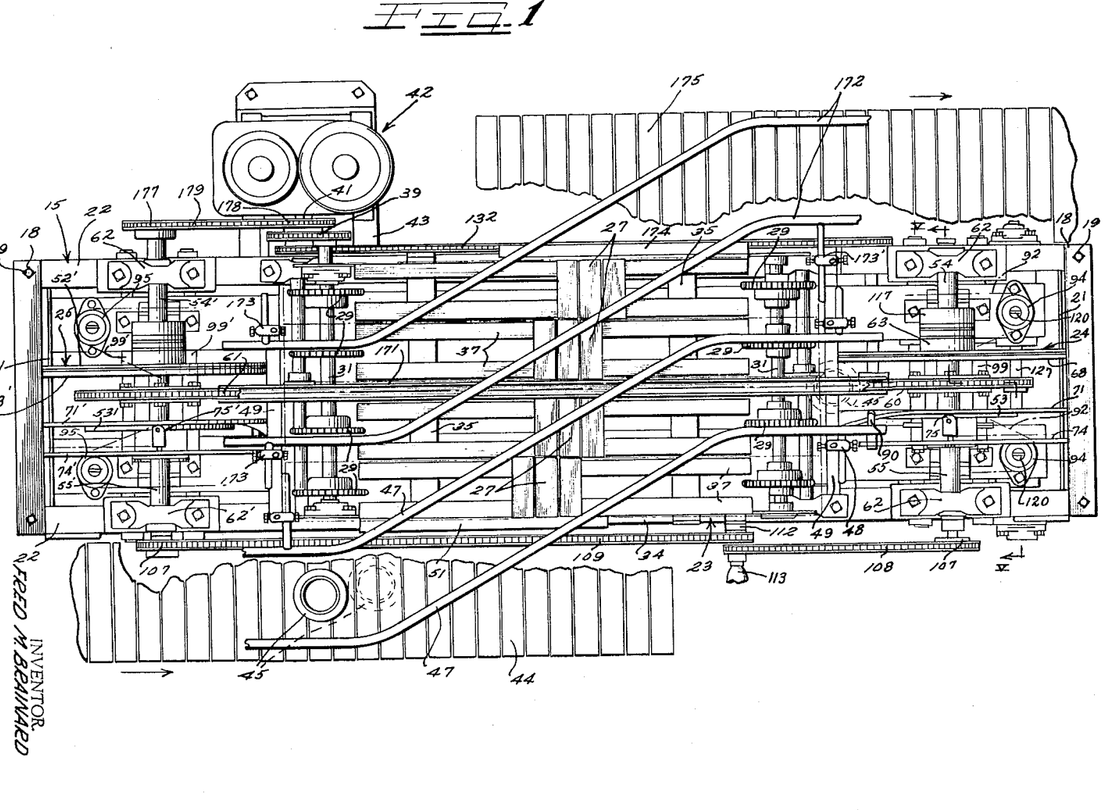
FIGURE 1 is a top plan view of a machine embodying features of the invention.
Figure 3:
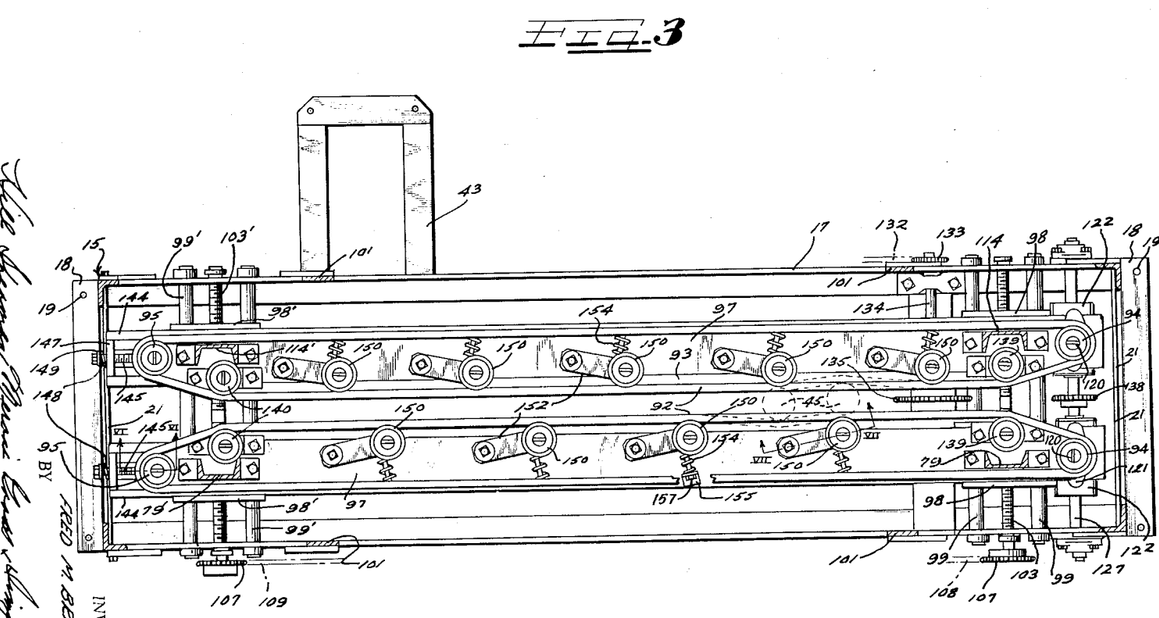
FIGURE 3 is a horizontal sectional elevational detail view taken substantially on the line III—III of FIGURE 2.
Figure 4:
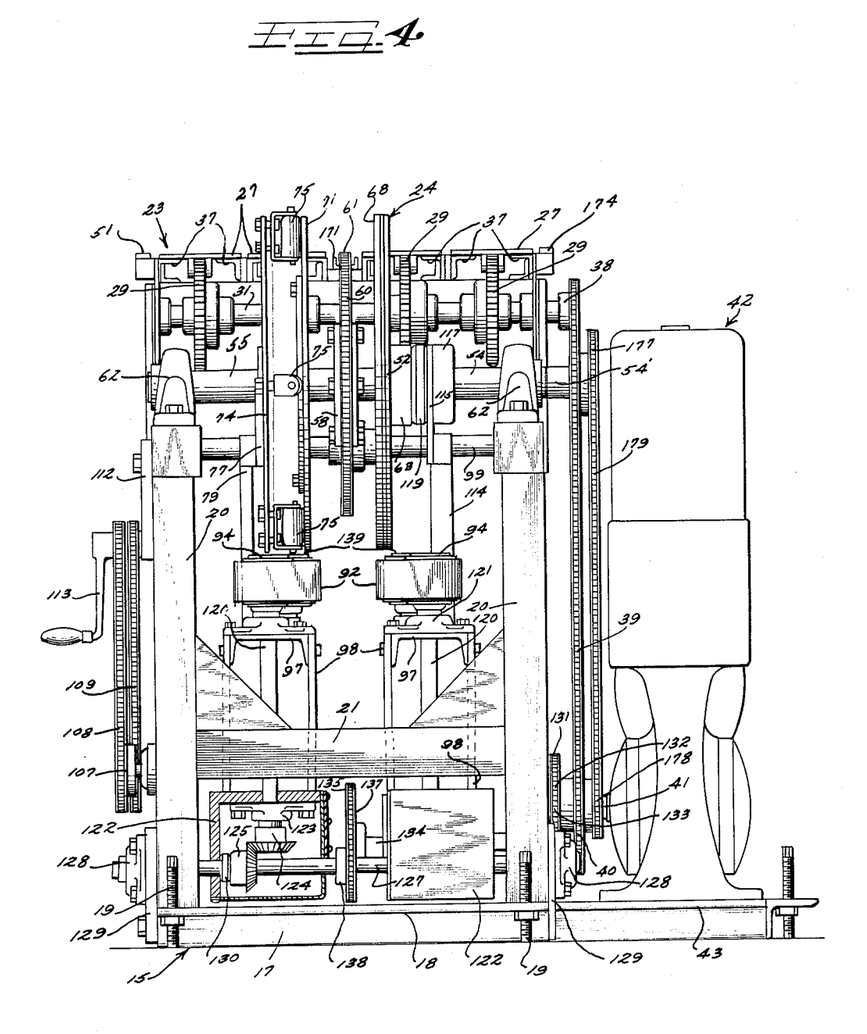
FIGURE 4 is an end elevational view of the machine looking toward the right end of FIGURE 2, and with certain parts broken away and in section for illustrative purposes.

For driving the conveyor chains 27 in unison, a driving connection is provided between one of the rotary shafts of the conveyor, herein the shaft 30, by suitable means such as a sprocket 38 mounted on one end thereof and a drive chain 39 trained over a driving sprocket 40 suitably mounted on a drive shaft 41 of a suitable electric motor and gear box unit 42 by preference mounted as a functionally integral part of the machine on a base frame extension 43 rigidly integral with the base frame structure 17 of the main frame 15 of the machine (FIGS. 1, 3 and 4).

Means are provided for delivering containers such as jars to be cleaned to the conveyor 23, and more particularly to the unison-actuated horizontally supported upper flights of the conveyor chains 27. While such means may take various forms to accommodate various production line requirements, one suitable arrangement is depicted in FIGURE 1 wherein a chain conveyor 44 mounted alongside and parallel to the machine and horizontally coplanar with the upper conveying flights of the conveyor chains 27 and running in the same direction as the conveyor 23, as indicated by directional arrow, delivers a succession of containers such as jars 45 forwardly between rod type parallel guide rails 47 adjustably mounted on suitable bracket assemblies 48 carried by respective cross bars 49 supported by uprights 50 mounted on the upper frame bars 22. The delivery guide rails 47 are properly angularly formed to shunt the jars 45 from the conveyor 44 across a sidewardly projecting sill bar 51 onto the conveyor chains 27 of the conveyor 23. By preference, the guide rails 47 continue to the forward longitudinally central portion of the conveyor 23 and have their forward extremities bracketing the rotary inverter 24, so that the jars 45 as they are moved forwardly are guided directly to the inverter.

As the jars 45 are guided from the forward end of the conveyor 23 by the guide rails 47, they are engaged by the inverter 24 which functions to move the jars from an upright condition as fed to the inverter into an inverted condition. To this end, the inverter 24 comprises an assembly including opposed gripper disks 52 and 53 (FIGS. 1, 2, 4 and 5) which are coaxially and corotatively mounted in spaced relation. Conveniently the disks 52 and 53 are mounted on respective half-shafts 54 and 55 having contiguous inner ends secured corotatively together by means of complementary attachment and clamping flanges 57 and 58 respectively secured together by a series of bolts 59 through their margins and through the inner margin of a sprocket member clamped between the margins of the flanges 57 and 58 and over which is trained a combination endless conveyor and drive roller chain 61. At their outer end portions the coaxial, corotative shaft members 54 and 55 are mounted in suitable bearing assemblies 62. Corotation of the disk 52 with the shaft 54 is effected through a hub 63 fixed on the outer face of the disk and keyed by a key 64 to the shaft 54. Similarly, the disk 53 is provided with a fixed hub 65 on its outer face which is secured by a key 67 to the shaft 55.

For positively but safely gripping the jars 45 and avoiding any breakage where the jars are made of glass, the opposed disks 52 and 53 are provided with resilient friction means. To this end, the disk 52 although conveniently comprising a metal plate, is equipped on the radially outer margin of its inner face with a resilient high friction gripper ring 68, in a satisfactory form comprising sponge rubber of suitable thickness bonded onto a metal disk backing ring 69 by which the gripper facing ring is adapted to be secured removably as by means of screws 70 to the margin of the disk 52.

In respect to the opposite disk 53, it is of substantially smaller diameter than the disk 52 and is provided with a flexible solid rubber disk gripper ring 71 secured at an inner margin thereof to the inner face of the radially outer margin of the disk 53 as by means of screws 72 and a clamping ring 73. At its outer diameter the flexible gripper ring 71 is substantially equal to the diameter of the disk 52 and the facing ring 68, and in its effective width, the flexible gripper ring 71 is at least equal to the effective gripping width of the opposed gripper ring 68. Thus, the gripper rings 68 and 71 provide an effective frictional gripping means for engaging the jars 45 therebetween.

Means are provided for effective back-up for the flexible frictional gripper ring 71 throughout the rotary travel of the inverter disk assembly from the time one of the jars 45 is gripped therebetween until complete inversion of the jar has been effected, and operative during such rotary travel for effecting a jostling, shaking movement of the jar from side-to-side to dislodge any debris contained in the jar, so that it will drop out readily upon swinging of the jar into inverted position. For this purpose, a supporting and back-up disk 74 of the same diameter as the disk 53 plus the frictional gripper ring 71 is mounted in non-rotatable relation coaxially and in predetermined limited spaced relation outwardly from the inverter disk 53 and carries a closely spaced series of resiliently biased back-up rollers 75 on its inner face each rotatably backing up the radially outer jar-engaging marginal portion of the flexible gripper ring 71. In this instance, the back-up disk 74 is secured in predetermined spaced relation to the inverter disk 53 by means of a bracket plate 77 secured by bolts 78 to a supporting standard 79. A flanged bushing 80 extends through a central aperture in the back-up disk 74 and is attached as by means of screws 81 to the hub 65. A spacer ring 82 is disposed between the inner margin of the back-up disk 74 and the gripper disk 53.

Each of the back-up rollers 75 is mounted on a rotary axis which is on a radius relative to the shaft 55, being rotatable on a shaft 83 journaled on a U-shaped bracket 84 which is attached in spaced relation to the inner outer marginal face of the back-up disk 74 by means of a radially spaced pair of attachment bolts 85 permitting a slight range of peripheral adjustment movement of the bracket 84 and retaining coiled compression springs 87 disposed thereabout and between the backs or webs of the brackets 84 and the opposing marginal face of the back-up disk. The springs 87 are of predetermined compressibility enabling a slight range of yielding of the roller assemblies by jar-imposed pressure against the rollers through the friction disk ring 71.

Figure 2:
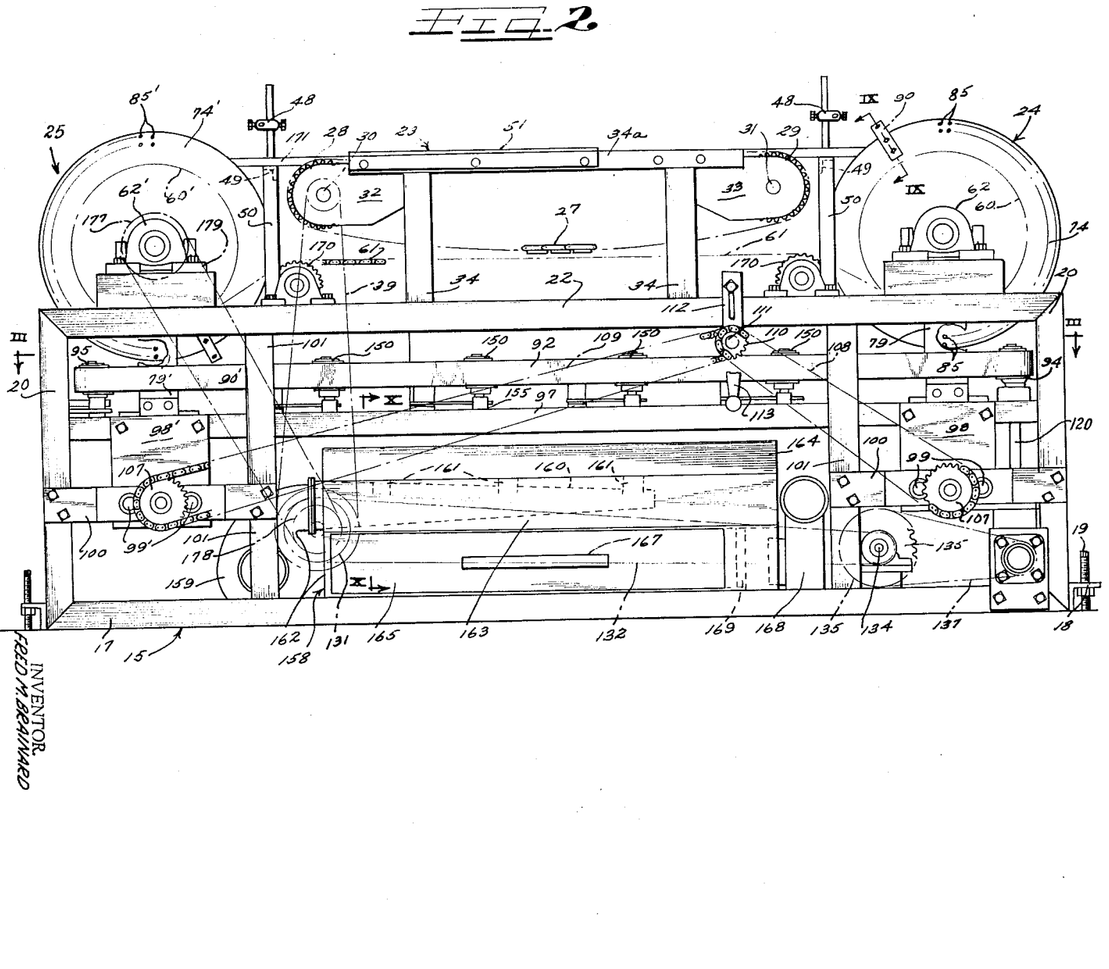
FIGURE 2 is a side elevational view of the same machine.
Figure 5:
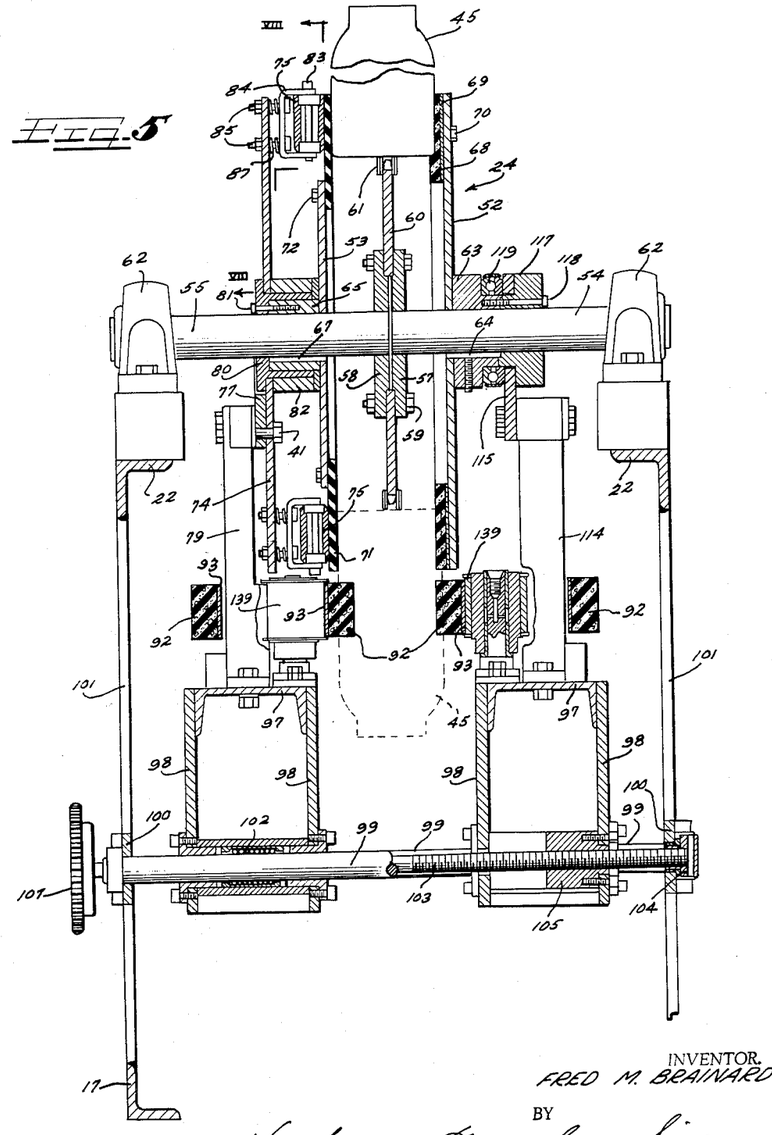
FIGURE 5 is a sectional detail view taken substantially on the line V—V of FIGURE 1.
Figures 8, 9, 10:
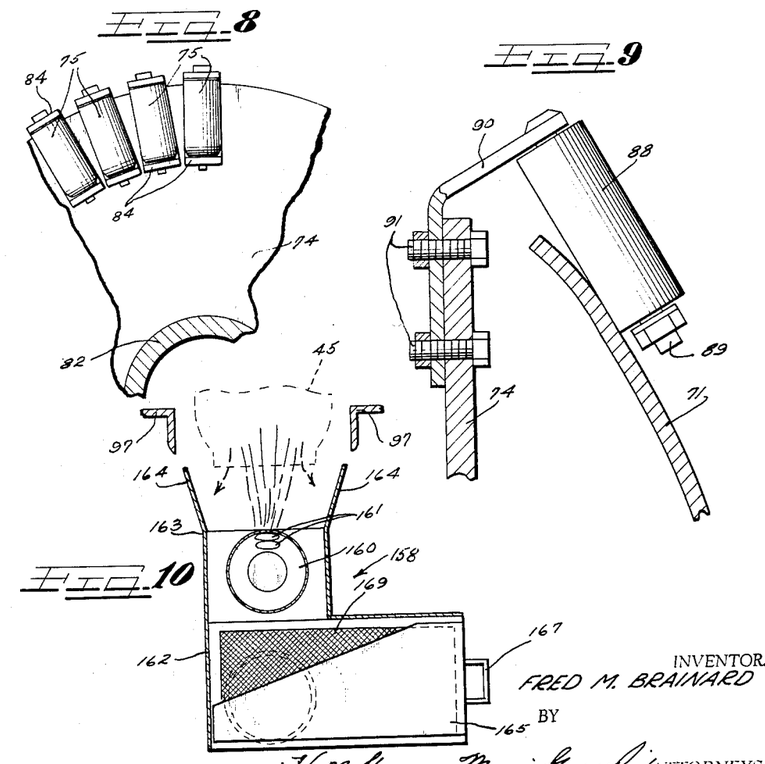
FIGURE 8 is a fragmentary elevational sectional detail view taken substantially on the line VIII—VIII of FIGURE 5.
FIGURE 9 is an enlarged fragmentary sectional elevational detail view taken substantially on the line IX—IX of FIGURE 2.
FIGURE 10 is a fragmentary sectional elevational detail view taken substantially on the line X—X of FIGURE 2.

In the present instance, the arrangement is such that the inverter carries the jars 45 respectively through an arc of about 180°, and therefore the back-up disk 74 is equipped with the rollers throughout 180° of its radially outer margin, as is well indicated in FIGURE 2, while FIGURE 5 shows the uppermost and lowermost of the rollers 75, namely, the opposite end rollers of the series. Where the diameter of the back-up disk 74 is on the order of seventeen inches a satisfactory arrangement has been a series of eighteen of the rollers mounted in the relationship best visualized in FIGURE 8. In this arrangement the rollers 75 have been of about one inch outside diameter.

In order to facilitate movement of the jars 45 into engagement between the opposed frictional gripping rings 68 and 71, means are provided for deflecting a portion of the flexible gripper ring 71 in advance of the first or uppermost of the back-up rollers 75. For this purpose a deflector roller 88 (FIGS. 1 and 9) is mounted rotatably on a diagonal shaft 89 carried by an angular bracket 90 attached as by means of screws 91 to the outer margin of the back-up plate 74. The location of the deflector roller 88 is such that it engages against the inner face of the friction ring 71 in that portion of the ring which, in the revolution of the ring, precedes the first or uppermost in the series of the back-up rollers 75 and is thus freely spaced from the back-up disk 74 so that such portion of the friction ring 71 can be freely flexed toward the back-up disk 74. By mounting of the deflector roller 88 in a circumferential position on the order of 25° to 30° in advance of the first of the series of back-up rollers 75, deflection of the friction ring 71 positively maintains its outer edge away from the oncoming jars 45 guided toward the inverter 24 by the guide rails 47 and, in effect, affords between the deflected portion of the friction ring 71 and the opposing portion of the opposed coactive friction ring 68 an entry mouth into which the jars 45 are successively fed. As the jars 45 enter the mouth thus provided, the deflected portion of the friction ring 71 serves as a lead-in cam for the entering jars 45 to effect centering of the jars as they are moved toward firmly gripped engagement between the friction rings at the first back-up rollers 75 in the series.

At the moment that each of the jars 45 is fully gripped retainingly by the friction rings 68 and 71, as depicted at the top of FIGURE 5, that portion of the jar perimeter engaged by the relatively thick sponge rubber gripping ring 68 becomes substantially cradled in the ring 68 by virtue of the resilient, elastic yieldability of the sponge rubber. This relationship is assured by proper adjustment of the spacing between the inverter disks 52 and 53 in relation to the diameter of the jars 45 being processed to afford an optimum spacing between the friction rings 68 and 71 at the back-up rollers 75 which is slightly less than the jar diameter of, for example, about half the thickness of the sponge rubber friction ring 68. This embedment or cradling of the engaged perimeter of the jar 45 by the friction ring 68 has the valuable function of not only assuring a firm frictional grip of the jar against displacement of the jar in its axial direction relative to the inverter disks, even though the inverter 24 may be operated at high speed so that there is substantial centrifugal force developed, but also functions to retain the jars against canting in a circumferential direction.

Since the rollers 75 are mounted under resilient, cushioned bias, the rollers 75 can yield slightly for self-adjustment with respect to oversize variables in the jar diameters. It will be understood, of course, that the resilient bias afforded by the springs 87 for the rollers 75 should be sufficiently greater or stiffer than the resilient bias of the friction ring 68 as compressed by the engaged jar perimeter to assure firm, positive grip of the jar perimeter by not only the friction ring 68 but also the friction ring 71.

Furthermore, the resilient flexibility and thus bias of the friction ring 68, tending to return its jar-engaging inner face to its normal face plane, is such that it tends constantly to thrust the engaged jar laterally toward the friction ring 71 in opposition to the spring bias of the rollers 75 with sufficient force to cause the flexible friction ring 71 to yield slightly between each pair of the rollers 75 whereby to effect a repetitive shaking action of the jars 45 as they are advanced toward inverted position by the inverter 24. This shaking action is implemented by the cylindrical structure of the rollers 75 and by their radial mounting on the back-up disk 74 whereby the radially inner ends of the rollers are relatively close together while the radially outer ends of the rollers are further apart, so that there is a widening space between each pair of rollers toward the outer perimeter of the roll assembly and thus toward the outer edge of the flexible friction ring 71. As a result, the friction ring 71 tends to deflect slightly more into the between-roller spaces progressively radially outwardly and this causes the jars 45 to shake with a side-to-side rocking action under the elastic thrust of the friction ring 68. Such rocking shaking of the jars is at a frequency proportionate to the number of spaces between rollers and the speed of rotation of the inverter 24. In practice this rocking, shaking, vibration of the jars 45 has been found quite advantageous in loosening debris and foreign matter such as dust in the jars so that the matter will dump out of the jars upon attaining the inverted condition in the inverter 24.

Although the loosened foreign material in the jars is fairly well dumped as the jars 45 reach the fully inverted position so that their open ends project downwardly as depicted in the lower portion of FIGURE 5, means are provided by the present invention to assure that any lightweight or fluffy material such as paper carton debris or dust that may cling within the jars and especially within the neck portions thereof after the initial clean-out action in the inverter 24 will be positively disengaged and removed before the jars are returned to the upright condition thereof. To this end, the inverted jars are transferred from the inverter 24 to a pair of coextensive horizontally running endless carrying belts 92 mounted to provide opposed horizontally spaced jar gripping runs whereby the inverted jars are transported from the inverter 24 and below the conveyor 23 to the returner 25. While being thus transported, the inverted jars 45 are subjected to further shaking and cleansing action. In an efficient construction, the carrying belts 92 (FIGS. 3, 4 and 5) are made from natural or synthetic sponge rubber of suitable frictional and wearing qualities, similar to the sponge rubber friction ring 68 but of preferably substantially greated thickness such as about twice the thickness of the gripper ring 68. The sponge rubber of the belts 92 is bonded as a facing to a thin substantially inelastic flexible belt backing 93 in each instance. At one end of the machine, herein the inverter end, the carrying belts 92 are trained over respective drive pulleys 94, and at the opposite or return end of the machine these belts are trained over respective idler pulleys 95.

Mounting of the pulleys 95 and 95 is effected in a manner to be perfectly synchronized for adjustment with the inverter 24 in respect to jar size. To this end the pulleys 94 and 95 for each of the belts 92 are mounted upon respectively opposite end portions of horizontal longitudinally extending parallel coplanar laterally spaced apart supporting beams 97 which are secured adjacent to their opposite end portions to spaced parallel supporting bracket plates 98 which, in turn, are carried by respective horizontally coplanar coextensive parallel spaced pairs of supporting shafts 99 extending across the frame 15 of the machine below the supporting beams 97 and having their respective opposite ends mounted on longitudinally extending supporting frame bars 100 secured at suitable elevation above the base frame structure 17 between the uprights 20, and additional uprights 101 suitably spaced from each of the end uprights 20 and secured rigidly to the base frame structure 17 and the upper rail bars 22 of the machine frame 15. To facilitate movement of the supporting platforms provided by the supporting means 97 toward and away from one another, the bracket plates 98 are equipped with suitable bearings 102 which ride on the respective shafts 99.

For varying the spacing between the supporting platform beams 97, respective adjustment screws 103 are mounted between the pairs of supporting shafts 19 and with the respective opposite ends of the adjustment screws carried by suitable bearings 104 mounted on the longitudinal supporting bars 100 at each side of the machine. Each half of the adjustment screw 103 in each instance is oppositely threaded, that is one half has a right-hand thread and the opposite half has a left-hand thread, and nuts 105 fixedly carried by one of each pair of the bracket plates 98 is threaded onto one of the respective threaded portions of the associated adjustment screw 103. A common end of each of the adjustment screws 103 extends outwardly beyond the adjacent bearing and has secured thereon a drive sprocket 107, and a sprocket chain 108 is trained over one of the sprockets 107 and a sprocket chain 109 over the other of the sprockets 107 (FIGS. 1 and 2), with both of the chains trained over respective sprockets 110 carried by a stub shaft 111 on a vertically adjustable bracket 112 mounted on the adjacent frame rail bar 22. A handle 113 (FIGS. 1, 2 and 4) mounted on the outer end of the stub shaft 111 is adapted to be manipulated to turn the stub shaft 111 and thereby the sprockets 110 to drive the chains 108 and 109 and thus synchronously drive the adjustment shafts 103 for adjusting the spacing between the platform beams 97 and thus the spacing between the belts 92 and simultaneously the spacing between the inverter disks 52 and 53.

Spacing adjustment of the disks 52 and 53 is effected by having the standard 79 on which the back-up disk 74 is mounted secured fixedly to the underlying platform beam 97. Spacing connection of the inverter disk 52 with the underlying platform beam 97 is effected by means of a rigid standard 114 attached to such beam 97 and carrying on its upper end portion an upstanding bracket plate 115 which is apertured to have the shaft 54 extended therethrough and is coupled for adjustment with the hub 63 by means of a flanged hub extension 117 extending through the bracket plate 115 and secured as by means of screws 118 to the hub 63 fixed to the disk 52. A thrust bearing 119 may be interposed between the bracket plate 115 and the hub 63 as shown (FIG. 5).

Each of the drive pulleys 94 is mounted on a vertical shaft 120 (FIGS. 1–4) journaled in a bearing 121 mounted on the respective associated end portion of the platform beam 97 and extending downwardly below the beam into a miter gear box or housing 122 which is rigidly supported by lower end extensions of and from the supporting bracket plates 98. On their lower end portions, the respective shafts 120 are journaled in suitable bearings 123 fixedly secured to the inner side of the roof of the respective housing 122. On its lower end portion below the bearing 123, each of the shafts 120 has a bevel or miter gear 124 fixed thereon and meshing with a complementary miter gear 125 which is keyed to a shaft 127 extending freely horizontally through the gear boxes 122 under the lower ends of the vertical shafts 120 and has its opposite ends rotatably journaled in suitable bearings 128 mounted on bracket plates 129 secured to the base framework 17. While the miter gear 125 is keyed for corotation with the shaft 127, it is freely longitudinally slidable on this shaft and has a butt end opposite its gear face opposed by a thrust bearing 130 which is interposed between such butt end and the adjacent vertical wall of the housing 122. Thereby, as horizontal adjustment movements of the gear housings 122 occur, the miter gear 125 will travel along the shaft 127 in mesh with the miter gear 124.

Power for driving the shaft 127 is derived from the power unit 42 through the drive shaft 41 thereof which carries a sprocket gear 131 over which is trained a drive chain 132 meshing with a transmission sprocket 133 carried by a transmission shaft 134 rotatably mounted inwardly from and parallel to the shaft 127 and carrying a driving sprocket 135 over which is trained a drive chain 137 which meshes with a sprocket 138 fixedly mounted on the shaft 127 between the gear box housings 122. Through this arrangement the drive pulleys 94 are driven at a proper speed and direction of rotation in synchronism with respect to each other and to the inverter 24 to drive the belts 92 at a continuous speed equaling the speed of rotation of the inverter 24, and more particularly the speed with which successive ones of the jars 45 are delivered to the carrying belts 92.

As best seen in FIGURES 3 and 4, the drive pulleys 94 are mounted in a spaced relation which is substantially greater than the diameter of any jar to be engaged between the carrying belts 92, and idler pulleys 139 are mounted on fixed rotatable vertical axes on the inner margins of the platform beams 97 between the vertical standards 79 and 114 (FIGS. 3 and 5) and aligned transversely with substantially the lowest approach of the rotary inverter 24. Thereby, the belts 92 run from the drive pulleys 94 convergently to and over the idler pulleys 139, providing an entry lead-in or mouth to the jar-carrying runs of the belts 92, leading to identical, complementary idler pulleys 140 mounted adjacent to, but spaced inwardly from the idler pulleys 95 at the opposite end of the machine. Between the idler pulleys 139 and 140, the carrying runs of the belts 92 are parallel and coextensive.

Figures 6, 7:
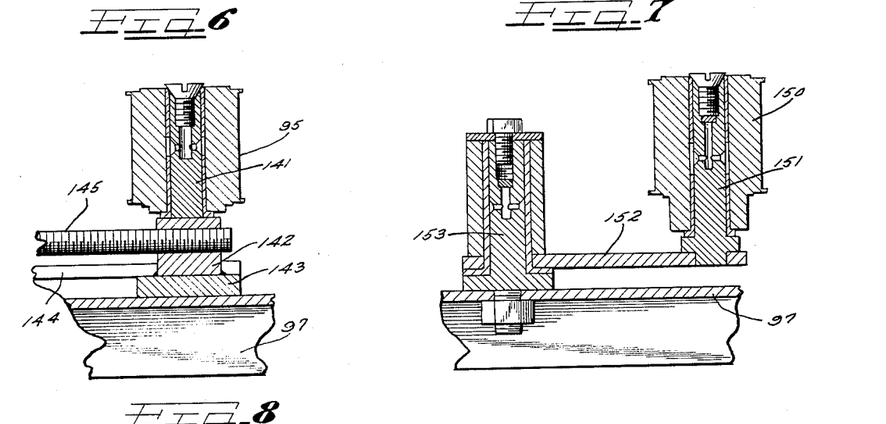
FIGURE 6 is an enlarged fragmentary sectional detail view taken substantially on the line VI—VI of FIGURE 3.
FIGURE 7 is an enlarged sectional detail view taken substantially on the line VII—VII of FIGURE 3.

From the idler pulleys 140, the carrying belts 92 diverge to the end idler pulleys 95 which are mounted in longitudinal alignment with the drive pulleys 94. It may be noted that the end idler pulleys 95 (FIGS. 3 and 6) are mounted for take-up longitudinally of the machine, and for this purpose are rotatable on vertical shafts 141 carried by a take-up assembly including a nut block 142 fixedly attached to a slide 143 guided in a gibway 144 mounted on the respective end portion of the platform beam 97. A take-up screw 145 is threaded longitudinally through the block 142 and extends endwise freely through an abutment plate 147 against which a compression spring 148 surrounding the outer end portion of the screw thrusts under compression from a washer 149 against which the head of the screw 145 engages. Through this arrangement, the idler pulleys 95 are movable by turning the screw 145 in each instance to slacken off the engaged carrying belt 92 for removal and replacement, and to tension such belt for service. It will be appreciated that the compression springs 148 afford a limited range of compensation yieldability or cushioning against unusual stresses on the engaged belt.

As each of the jars 45, fully inverted as shown in the lower portion of FIGURE 5 enters between the carrying belts 92 as oriented by the idler rollers 139, such jar is gripped by and between the carrying belts 92 intermediate the length of the jar and beyond the base end portion of the jar engaged by the inverter 24. Since the carrying belts 92 in their gripping body portions are of sponge rubber of substantial resilience and of substantial width and thickness, and desirably spaced to have the opposed gripping faces thereof closer together by about the equivalent of the thickness of the inverter gripping ring 68, and in any event effectively less than the diameter of the jar 45, a highly efficient substantially equal frictional cradled gripping engagement of diametrically opposite portions of the jar perimeter is accomplished by the engaging substantially compressed opposed jar-contacting areas of the carrying belts. Thereby, the inverted jar 45 is supported quite positively against vertical displacement as well as against canting relative to the carrying belts 92.

Since the nips of the idler rolls 139 are substantially aligned with a plane through the lowermost and thus the last in the series of back-up rollers 75 of the inverter 24, virtually simultaneous release of the inverted jar 45 from the inverter 24 occurs as the jar is firmly engaged by and between the carrying belts 92. Immediately beyond the nip of the last back-up roller 75, there is completely free spacing between the flexible gripper ring 71 and the back-up plate 74 so that the gripper ring 71 releases its grip on the inverted jar 45, which thus moves on without interruption in the horizontal path defined by the carrying belts 92.

As will be clear from especially FIGURES 2 and 3, the distance traversed by the jar-carrying runs of the belts 92 between the inverter 24 and the returner 25 under the conveyor assembly 23 affords an ample span within which continuation and completion of clean-out of the inverted jars 45 can be effected. In this span of travel, means are provided not only for supporting the carrying runs of the belts 92 against sagging under the weight of the inverted jars 45 being transported, but also to impart further clean-out shaking vibration of the inverted jars. In a desirable structure, such means comprise a series of spaced idler pulleys 150 for each of the carrying belts 92 operatively mounted on the adjacent platform beam 97. Each of these idler pulleys may be identically constructed and mounted as best seen in FIGURE 3 to be resiliently biased toward and into supporting backed-up relation against the backing 93 of the respective carrying belts.

In a practical construction, each of the pulleys 150 is freely rotatably mounted as an idler upon a vertical axis stub shaft 151 (FIGURE 7) carried by a horizontal arm 152 suitably mounted for free swinging on a stub shaft 153 secured fixedly upon the associated platform beam 97. Biasing means comprises a compression spring 154 (FIGURE 3) thrusting against the arm 152 adjacent to the pulley carrying end thereof and against a fixed abutment bracket 155, with a screw 157 carried by the bracket 155 affording a removable retainer for the spring. The biasing spring 154 is of suitable compression thrust value to maintain a resiliently yieldable bias of the associated pulley 150 which will maintain the pulley firmly in engagement with the associated carrying belt 92 for not only assuring effective vertical support for the belt by the flanges of the pulley but also firmly resist shifting of the engaged portion of the belt outwardly from its jar-carrying run path as each of the carried jars passes the pulley. On the other hand, the biasing spring 154 does provide a safety cushion for its pulley 150.

Each of the series of belt-supporting idler pulleys 150 has the respective pulleys thereof substantially uniformly spaced longitudinally along the supported and backed up span of the associated carrying belt 92. This spacing between the rollers of each series is desirably substantially identical and affords between each adjacent pair of the pulleys 150 in each of the series a predetermined limited length portion of the associated belt 92 free from any back-up and thus slightly horizontally flexible from a straight carrying run path. This slight yieldability of the between-pulley portions of the carrying belts 92 is utilized to advantage for shakingly vibrating the inverted jars 45 as they travel the transport span with the belts 92. Herein this is accomplished by having the idler pulleys 150 of each series respectively opposite the free between-pulley, flexibly yieldable portion of the opposite belt between the nearest pair of idler pulleys of the other series. As a result, as each of the inverted jars transported by the carrying belts 92 arrives opposite one of the idler pulleys 150 which firmly holds the belt 92 engaged by that pulley against deflection away from the jar, there is a slight yielding of the opposite unsupported free portion of the opposite belt 92 by virtue of the expansion of the sponge rubber body of the pulley-backed belt, which causes the jar to be shifted slightly away from the adjacent pulley 150. As the jar is carried on toward the next pulley 150 in the opposite series, this lateral shifting is reversed. Furthermore, at the substantial speed at which the carrying belts 92 are desirably operated, the side-to-side motion of the rapid succession of inverted jars causes a vibratory reaction in the spring biased idler pulleys 150 which further enhances the vibratory, clean-out shaking of the jars.

Although heavier foreign particles in the jars are effectively discharged gravitationally by the inversion as supplemented by the vibratory shaking to which the jars are subjected, additional positive clean-out means are desirably employed to assure removal of any dust or lightweight and possibly flocculent matter that may resist gravitational and vibratory dislodgment. Such additional clean-out means conveniently comprises a device for directing streams of a clean-out fluid such as air forcefully into the inverted jars for thereby flushing out the remaining foreign material.

In an exemplary form, an air stream type clean-out device 158 (FIGS. 2 and 10) includes a suitable blower 159 which may be of any approved centrifugal type discharging into an elongated manifold 160 located under the platform beams 97 and provided with a longitudinally spaced series of nozzles 161 discharging upwardly in alignment with and into the open ends of the inverted jars 45 as they are transported by the carrying belts 92. As the air streams from the ports or nozzles 161 flush material out of the inverted jars 45, substantially as indicated by directional arrows in FIG. 10, such material is collected in a collector housing 162 below the manifold 160 and desirably provided with a longitudinal receiving trough 163 housing the manifold 160 in spaced relation and having upwardly extending flaring lead-in flanges 164 extending to a sufficient height to lie in freely spaced adjacent relation to the downwardly opening mouth ends of the inverted jars 45. Within the housing 162 is a removable receptacle 165 in the form of a clean-out drawer having a handle 167. Suction to assure deposit of dislodged material in the housing 162 and more particularly in the clean-out drawer 165 is effected by means such as a suction blower 168 communicating with the lower portion of the housing 162, with a filter 169 interposed between the interior of the housing 162 and the suction port for the suction or exhaust blower 168. Through this arrangement, effective, dust free removal and collection of loose foreign material from the inverted jars is accomplished.

Finally, after the inverted jars 45 have been thoroughly cleaned out they reach the end of the conveyor system provided by the carrying belts 92 and as each jar reaches a point between the nips of the idler pulleys 140 from which the carrying belts 92 run divergently to the take-up pulleys 95, to thus completely release the jars from the belts, each of the inverted jars is engaged by the returner 25 and swung upwardly into upright position and returned to the conveyor 23. For purposes of standardization and because the same structure will work just as effectively to return the jars to upright condition as the inverter 24 carries the jars into an inverted condition, every structural detail of the returner 25 will be understood to be the same as and to function the same as the structural details described in connection with the inverter 24 and because of such identity, primed reference numerals have been applied to the various elements of the returner 25, and for a description of any details not specifically referred to reference is invited to the description of the counterpart details of the inverter 24.

In respect to the returner 25, the gripper rings 68' and 71' are oriented with respect to the carrying span of the belts 92 at the idler pulleys 140 to receive the base end portions of the inverted jars. For this purpose, the diverter for the freely flexible portion of the flexible gripper ring 71' has its mounting bracket 90' secured in advance of the lowermost of the back-up rollers 75' to afford a free entry for the base end portions of the jars between the gripper rings 68' and 71' which firmly grip the jar as it reaches the first of the back-up rollers 75' appropriately aligned wtih respect to the nips of the idler pulleys 140.

Rotation of the returner 25 is synchronous with the inverter 24 as effected through the sprocket chain 61 which, as previously described is trained over the sprocket wheel 60 of the inverter 24, and which is similarly trained over the sprocket wheel 60' of the returner 25. Between the sprocket wheels 60 and 61', the lower run of the chain 61 travels over supporting idler sprockets 170 to maintain it free from structure therebelow. The upper run of the sprocket chain 61 runs in a longitudinal horizontally straight upwardly opening supporting channel 171 extending centrally of and as part of the conveyor 23 between the flights of the conveyor chains 27 and with the top of the chain 61 substantially flush with the supporting surfaces of the conveyor chains 27. In FIGURES 1 and 2 it will be observed that the opposite ends of the supporting channel 171 are located near the uppermost reaches of the sprocket wheels 60 and 60' whereby the upper reach of the chain 61 is supported against sagging between the sprocket wheels and serves as a transitional conveyor between the respective opposite ends of the conveyor surfaces provided by the conveyor chains 27 and the inverter 24 and the returner 25. Further, the diameter of the sprocket wheels 60 and 60' is predetermined to gauge the length to be engaged of the base end portions of the jars 45 as they are transferred to and carried by the inverter 24, and, again, as they are carried by the returner 25.

In order to assure close successive delivery of the containers 45 by the conveyor 23 to the inverter 24 the conveyor chains 27 may be operated to overrun the conveyor chain 61 slightly. Thus, due to the slightly greater speed of travel of the conveyor chains 27 they will move the containers in a manner to crowd the containers toward the inverter.

As each of the cleaned jars is swung toward upright position by the returner 25, the series of back-up rollers 75' assures firm grip of the jars commensurate with the grip of the jars in the inverter 24, and as the jars attain the fully upright position, they are released from the returner 25 by relaxation of the gripper ring 71' beyond the uppermost of the roller 75' and the released upright jars are received between take-off guide rails 172 supported by bracket structures 173 at suitable height adjustably in horizontal parallel relation over the conveyor 23. These guide rails 173 have their jar-receiving end portions bracketing the returner 25, and are angularly constructed to guide the cleaned upright jars as propelled from the returner 25 and the driving-conveyor chain 61 onto the conveyor chains 27 laterally to the opposite side from the delivery conveyor 44 across a sill 174 onto a take-away conveyor 175 by which the jars are carried to a use point or other place as desired.

It will be appreciated that all of the several drives for the machine, receiving their motivation from the common power source 42 are properly coordinated by proper gear ratios, and the like, for as nearly as practicable perfect coordination and synchronization of the motivated assemblies for continuous, smooth, uniform movement of the jars delivered to the conveyor 23 throughout the cleaning cycle and discharge of the jars from the machine. Although the delivery conveyor 44 and the take-away conveyor 175 could be functionally integral parts of the machine and derive their driving impulsion from the power unit 42, they are conveniently, as in the illustrated instance separate and independent conveyors which may, if desired, be operated at a speed differential to that of the conveyor 23. For example, the take-away conveyor 175 may be operated at a slightly greater speed than the conveyor 23 so as to effect a predetermined spaced relationship of the successive cleaned jars to accommodate a filling or packing line or the like.

Synchronization of the inverter 24 and the returner 25 is accomplished, as previously discussed, by a common diameter of the respective sprocket wheels 60 and 60'. In addition, a drive sprocket 177 (FIGS. 1, 2 and 4) fixed upon an outward extension of the shaft 54', and a drive sprocket 178 on the drive shaft 41, and over which is trained a drive chain 179, are in proper ratio one to the other and to the sprocket wheels 60 and 60' to assure the desired rotary synchronization of the inverter 24 and the returner 25 with respect to the linear rate of travel of the conveyor chains 27 and the reversely traveling conveyor or carrying belts 92.

Another pertinent observation is that the machine of the present invention is exceedingly compact and occupies a minimum of working space in relation to its work load capacity. For example, the practical, self-contained machine illustrated, and which is of a size suitable for handling glass jars from ½ gal. downward, has a length slightly under seven feet, a width slightly under three and one-half feet inclusive of the projection of the base 43 for the power unit and the handle 113 from the sides of the machine proper, and a height just under three feet at the level of the conveyor 23 while the supporting posts for guide bars 47 and 172 rise another six or seven inches. The machine can therefore be easily accommodated in a production line set up where space is at a premium. It is also readily transportable from a shop where it is made to the location where it is to be used, and it is readily portable by the user.

Dimensionally, of course, the machine may be accommodated to handle a large variety of different sizes as well as different shapes of containers. For example, by appropriate size reduction of all or some of the components of the machine it can be constructed to handle small size containers on the order of those commonly provided for pharmaceuticals. On the other hand, for handling larger containers such, for example, as paint drums and the like, certain or all of the dimensions of components of the machine may be made of larger size.

For handling containers that may have a variable shape, such as tapered, for example, adjustment or mounting of the carrying belts 92 may be effected by the mounted or adjusted disposition of the idler pulleys 139 and 140 as well as the idler pulleys 150 to be closer together than the gripping rings 68 and 71 of the inverter and the corresponding gripping rings 68' and 71' of the returner. On the other hand, for jars that are tapered to be larger toward their open end, a reverse adjustment or mounting may be effected.

It should also be noted that although the machine has been illustrated and described as operating to run from left to right as viewed in FIGURE 1, it may be converted to run in the opposite direction by reversing the direction of the several drives, and by shifting the mounting of the inverter assembly 180° so that it becomes a returner and by shifting the returner assembly 25 180° so that it becomes an inverter. Thus, in view of the standardization of parts, in the inverter and returner, particular customer requirements can be readily met in respect to direction of travel of the running components of the machine.

In practice, quart size jars have been run through the machine, full cycle, at the rate of about 500 per minute. With smaller sizes of container proportionately faster speeds are attainable.

Although air has been indicated as a clean-out fluid, it is readily apparent that steam, water, suitable gas and the like may be employed where required. Furthermore, in the lower inverted carrying run of the machine provided by the carrying belts 92, sterilization of the containers may be effected by heat, ultrasonic sound waves, sterilizing light rays, ozone, and the like. Although the machine is especially suitable for inversion clean-out of containers, it may also be utilized for inversion of fully packed containers and is especially suitable for eliminating stratification in package contents. For this purpose, the vibratory shaking of the filled containers not only in the inverter, but also in the horizontal inverted transfer conveyor afforded by the belts 92, but also in the returned implements the elimination of stratification in the contents of the containers.

Suitable enclosing housing for the machine may be and most generally is, provided for safety and protection purposes as well as neat appearance, but such housing has been omitted from the drawings herein as it is a matter of choice or preference and has no functional relationship to the mechanism of the machine aside from providing an enclosure therefor.

It will be understood that modifications and variations may be effected without departing from the scope of the novel concepts of the present invention.

I claim as my invention:

1. In apparatus of the character described for inverting containers from an upright position into an inverted position and returning them to the upright position, including:

a horizontal conveyor to which the containers are fed initially and from which the containers are delivered finally,     a rotary inverter having opposed high friction grippers engageable with the upright containers as delivered thereto by said conveyor and movable to invert the containers as gripped thereby, a carrier comprising high friction parallel horizontally spaced carrying belts receptive of and engageable with inverted containers from said inverter and movable in a carrying span under said conveyor to transport the containers in inverted position, and a returner including opposed high friction members receptive of the inverted containers from said belts and engageable with such containers and operative to move the inverted containers into upright position on said conveyor, said inverter having means for effecting a shaking vibrational movement of the containers as they are being moved from upright to inverted position.

2. In apparatus for cleaning containers such as jars, means receptive of a succession of the containers in upright open top condition and operative to convey the containers to a predetermined position, means operative to engage the containers at said position and invert the containers and while inverting the containers subjecting the containers to a side-to-side shaking vibrational action to loosen and facilitate dislodgment of foreign material from interiors of the containers as they are inverted, means engageable with opposite sides of the inverted containers for transporting them away from said inverter and with their open tops facing freely downwardly for discharge of material cleaned therefrom, and means receptive of the inverted containers from said transporting means and operative to return the containers in upright position to said first-mentioned means.

3. In apparatus for handling containers such as jars to be cleaned, a conveyor assembly mounted at a predetermined elevation and receptive of containers in upright position for moving the containers to one end of the conveyor, supporting means mounted under said conveyor and comprising a pair of horizontally spaced supporting structures, means for adjusting the spacing between said supporting structures, an inverter comprising opposed corotational jar gripping structures adjustably attached to the respective supporting structures and engageable with successive upright containers as supplied thereto by said conveyor and rotatable to invert the containers, respective carrying means supported by said respective supporting structures and engageable with the inverted containers from said inverter and operative to carry the inverted containers to a point beyond the opposite end of said conveyor, and a returner assembly including opposed rotary corotatable grippers engageable with the inverted containers as delivered to them by the carrying means for returning the containers to upright position with respect to said conveyor and being respectively connected to said respective supporting structures, whereby said inverter and said returner as well as said carrying means are adjustable in unison for different diameters of containers.

4. In apparatus for cleaning rigid containers on the order of jars, means for receiving and supporting the containers open end up, a pair of elongated carriage members, means supporting said carriage members in horizontally spaced parallel relation for adjustment in the spacing to accommodate containers of variable width, inverter means comprising opposed portions respectively carried by said carriage members and adjustable as to spacing by adjustments of said carriage members, said inverter portions being operative to engage upright containers from said receiving and supporting means to invert the containers, opposed carrying members carried by said carriage members and adjustable as to spacing with said carriage members and operable to receive and grip inverted jars therebetween from said inverter and to transport the jars along said carriage members with their open ends down and free to discharge material to be cleaned therefrom, and a returner comprising opposed portions respectively carried by said carriage members and adjustable as to spacing therewith and operative to receive inverted containers from said transporting means to return the containers in upright position with respect to said receiving and supporting means.

5. In apparatus for cleaning rigid containers on the order of jars, means for receiving and supporting the containers open end up, an inverter receptive of the containers from said receiving and supporting means and comprising opposed corotative disk assemblies one of which has a circular sponge rubber gripping member thereon of sufficient thickness to cradle the jars and the opposing of which has a friction faced member opposing the gripper member in less spaced relation to the normally opposing surface of the sponge rubber gripping member than the diameter of the jars so as to press the jars into the sponge rubber gripping member whereby the jars are effectively gripped and held against axial or canting movement, means acting on said opposing member for repeatedly vibrating the containers while in the cradled grip of the sponge rubber member, carrying means receptive of the inverted containers from said inverter and arranged to carry the containers in inverted position, and means receptive of the inverted containers from said carrying means and operative to return the containers into upright position.

6. In apparatus for cleaning containers such as jars, means receptive of a succession of the containers in upright open top condition and operative to convey the containers to a predetermined position, means operative to engage the containers at said position and invert the containers and while inverting the containers subjecting the containers to a side-to-side shaking vibrational action to loosen and facilitate dislodgment of foreign material from interiors of the containers as they are inverted, means engageable with the inverted containers for transporting them away from said inverter, and means associated with said transporting means for continuing the shaking vibrational movement of the jars while being transported in said inverted position.

7. In appartus for cleaning rigid containers on the order of jars, means for receiving and supporting the containers open end up, and inverter receptive of the containers from said receiving and supporting means and comprising opposed corotative disk assemblies one of which has a circular sponge rubber gripping member thereon of sufficient thickness to cradle the jars and the opposing of which has a friction faced member opposing the gripper member in less spaced relation to the normally opposing surface of the sponge rubber gripping member than the diameter of the jars so as to press the jars into the sponge rubber gripping member whereby the jars are effectively gripped and held against axial or canting movement, means acting on said opposing member for repeatedly vibrating the containers while in the cradled grip of the sponge rubber member, a pair of opposed horizontally spaced endless carrying belts aligned for receiving the inverted containers from said inverter and each provided with a jar-engaging facing of substantial thickness of sponge rubber the opposing faces of which are spaced less than the diameters of the jars so that the inverted jars are gripped in mutually cradling engagement by the belts to retain the jars not only against downward displacement but also against canting displacement while being transported by the belts, and means retaining the belts in the jar gripping engagement while transporting the jars.

8. In apparatus for cleaning rigid containers on the order of jars, means for receiving and supporting the containers open end up, an inverter receptive of the containers from said receiving and supporting means and comprising opposed corotative disk assemblies one of which has a circular sponge rubber gripping member thereon of sufficient thickness to cradle the jars and the opposing of which has a friction faced member opposing the gripper member in less spaced relation to the normally opposing surface of the sponge rubber gripping member than the diameter of the jars so as to press the jars into the sponge rubbed gripping member whereby the jars are effectively gripped and held against axial or canting movement, means acting on said opposing member for repeatedly vibrating the containers while in the cradled grip of the sponge rubber member, a pair of opposed horizontally spaced endless carrying belts aligned for receiving the inverted containers from said inverter and each provided with a jar-engaging facing of substantial thickness of sponge rubber the opposing faces of which are spaced less than the diameters of the jars so that the inverted jars are gripped in mutually cradling engagement by the belts to retain the jars not only against downward displacement but also against canting displacement while being transported by the belts, a pair of rollers mounted on vertical axes adjacent to the lower-most portion of the inverter and disposed to guide the belts to converge into jar-gripping relation correlated with the completion of inversion and release of the respective jars by the inverter.

9. In apparatus for handling containers such as jars to be cleaned, a supporting frame structure, a pair of beams extending longitudinally in substantially coextensive spaced parallel horizontal relation, means on said structure supporting said beams for movement toward and away from one another for adjusting the spacing therebetween, means for effecting said spacing adjustment of the beams, longitudinally extending endless conveyor means mounted on said structure at a substantial elevation above said beams, a rotary inverter assembly and a rotary returner assembly located in operative alignment with the conveyor means adjacent to but spaced from respective opposite ends of the conveyor means, each of said assemblies comprising opposed spaced container engaging disk means, means respectively supporting the disk means of each of the assemblies on said beams respectively whereby the disk means are adjustable as to spacing to accommodate containers of different sizes by the spacing adjustment of the beams, each of the assemblies having extending coaxially through and keyed to the disk means a rotary drive shaft mounted in axially fixed but rotary relation upon said structure and relative to which shafts the disk means are axially adjustably movable, a respective rotary member fixedly mounted corotatively with each of the shafts and disposed between said disk means, a flexible driving member for driving said rotary members and thereby the shafts and said disk means in unison and including a run parallel with said conveyor means and affording container-supporting transition means between the respective ends of the conveyor means and said assemblies, and transporting endless belt means including opposed conveyor gripping and transporting runs aligned with the lower portions of the disks to transport inverted containers between said assemblies, said beams having pulleys mounted thereon on vertical axes over which said belt means are trained and which pulleys are adjustable to adjust the spacing between said opposing runs of the belt means by the relative spacing adjustment of the beams, whereby said assemblies and belt means are adjustable in unison for different sizes of containers.

10. In apparatus for cleaning containers such as jars, means receptive of a succession of the containers in upright open top condition and operative to convey the containers to a predetermined position,
means operative to engage the containers at said position and invert the containers and while inverting the containers subjecting the containers to a side-to-side shaking vibrational action to loosen and facilitate dislodgment of foreign material from interiors of the containers as they are inverted,
opposed endless conveying members engaging the inverted containers on opposite sides and transporting them from the inverter with the open tops of the containers freely downward for discharge of foreign material to be cleaned therefrom,
and means located at spaced offset intervals along both of said endless transporting conveyors and operative to deflect the endless conveyors repeatedly in alternately opposite directions and thereby shaking the containers from side-to-side while transported in the inverted position thereof.

11. In apparatus for cleaning rigid containers on the order of jars,
means for receiving and supporting the containers open end up,
an inverter receptive of the containers from said receiving and supporting means and comprising opposed corotative disk assemblies each of which has a gripping member thereon opposing the other gripping member to engage the containers at their sides and hold them against axial or canting movement,
means acting on one of said opposed gripping members for repeatedly vibrating the same and thereby the containers in side-to-side relation,
a pair of opposed horizontally spaced endless carrying belts aligned for receiving the inverted containers from said inverter and each provided with a container-engaging facing of substantial thickness of sponge rubber the opposing faces of which are spaced less than the diameters of the containers so that the inverted containers are gripped in mutually cradling engagement by the belts to retain the containers not only against downward displacement but also against canting displacement while being transported by the belts,
a pair of rollers mounted on vertical axes adjacent to the lowermost portion of the inverter and disposed to guide the belts to converge into container-gripping relation correlated with the completion of inversion and release of the respective containers by the inverter,
means spaced at intervals along at least one of said endless carrying belts and operative to deflect such carrying belt and the containers carried thereby in vibratory side-to-side motion to shake material to be cleaned from the containers as they are transported by the belts,
and means driving said receiving and supporting means and said inverter and said belts in unison.

References Cited by the Examiner

UNITED STATES PATENTS

| 1,049,523 | 1/13 | Parker | 214—311 |
|---|---|---|---|
| 1,302,142 | 4/19 | Donovan. | |
| 1,588,903 | 6/26 | Parker | 198—103 |
| 1,917,659 | 7/33 | Marshall | 198—165 |
| 1,955,983 | 4/34 | Stebler et al. | 214—308 |
| 2,119,596 | 6/38 | Mintert et al. | |
| 2,372,646 | 4/45 | Barnby et al. | 198—165 |
| 2,482,916 | 9/49 | Kane | 198—103 |
| 2,593,627 | 4/52 | Stover | 198—33.4 |

(Other references on following page)

UNITED STATES PATENTS

| | | | |
|---|---|---|---|
| 2,715,973 | 8/55 | Winfree et al. | 214—308 |
| 2,738,866 | 3/56 | Vamvakas et al. | 198—103 X |
| 2,797,003 | 6/57 | Altenpohl | 214—308 |
| 2,812,085 | 11/57 | Copping | 198—33.4 X |
| 2,826,207 | 3/58 | Krupp et al. | |
| 2,865,516 | 12/58 | Hedderich | 214—1 |
| 2,879,882 | 3/59 | Whelan | 198—33.4 |
| 2,910,205 | 10/59 | Kretschmer et al. | 198—165 X |
| 2,935,215 | 5/60 | Rose | 214—308 X |
| 2,978,231 | 4/61 | Eisenberg | 259—72 |
| 2,980,938 | 4/61 | Whelan | 15—304 |
| 3,071,258 | 1/63 | Seigh et al. | 214—1 |

FOREIGN PATENTS 681,605　10/52　Great Britain.

HUGO O. SCHULZ, *Primary Examiner*.

CHARLES A. WILLMUTH, GERALD M. FORLENZA, *Examiners*.